United States Patent [19]

Deesen et al.

[11] Patent Number: 5,100,329
[45] Date of Patent: Mar. 31, 1992

[54] COMPUTER ASSISTED COACHING METHOD

[76] Inventors: Kenneth C. Deesen, 32-27 167th St., Flushing, N.Y. 11358; Avinash G. Tilak, 174 Mount Kemble Ave., Morristown, N.J. 07960

[21] Appl. No.: 619,655

[22] Filed: Nov. 27, 1990

Related U.S. Application Data

[63] Continuation of Ser. No. 542,801, Jun. 22, 1990, abandoned, which is a continuation of Ser. No. 250,434, Sep. 28, 1988, abandoned.

[51] Int. Cl.$^5$ .............................................. G09B 7/00
[52] U.S. Cl. ......................................... 434/327; 434/85; 434/362; 273/433; 364/419
[58] Field of Search ................ 434/85, 169, 323, 325, 434/327, 356, 358, 362; 273/433, 85 G; 358/96; 382/48, 58, 59; 364/410, 419, 200 MS File, 900 MS File

[56] References Cited

U.S. PATENT DOCUMENTS

| | | | |
|---|---|---|---|
| 3,371,321 | 2/1968 | Adams | 434/169 |
| 3,405,457 | 10/1968 | Bitzer | 434/323 |
| 4,360,345 | 11/1982 | Hon | 434/323 |
| 4,421,487 | 12/1983 | Laughon et al. | 434/327 |
| 4,464,118 | 8/1984 | Scott et al. | 434/85 |
| 4,518,361 | 5/1985 | Conway | 434/362 X |
| 4,608,601 | 8/1986 | Shreck et al. | 434/323 |
| 4,611,996 | 9/1986 | Stoner | 434/323 |
| 4,633,416 | 12/1986 | Walker | 434/85 |
| 4,793,810 | 12/1988 | Beasley, Jr. | 434/85 |

FOREIGN PATENT DOCUMENTS

2020077  11/1979  United Kingdom ................ 434/169

Primary Examiner—Richard J. Apley
Assistant Examiner—Joe H. Cheng
Attorney, Agent, or Firm—Donald S. Dowden

[57] ABSTRACT

A computerized method is provided for helping students in acquiring and developing the ability to perform an art or skill. This is done in an interactive sequence wherein responses made by a student to inquiries and directives are digitized and compared with hidden idealized parameters and with previous responses, and an evaluation is communicated to the student with encouragements.

12 Claims, 3 Drawing Sheets

COMPUTER ASSISTED COACHING METHOD

This is a continuation of application Ser. No. 07/542,801, filed June 22, 1990, now abandoned, which was a continuation of application Ser. No. 07/250,434, filed Sept. 28, 1988, now abandoned.

REFERENCE TO RELATED DOCUMENT

The computer assisted coaching method and means of the present invention has been documented in Disclosure Document No. 180,038 filed Oct. 29, 1987.

SUMMARY OF THE INVENTION

While a human teacher is far more flexible than a teaching machine, the present invention is not only practical and effective but, unlike the human teacher, it is infinitely available, tireless and cost effective.

The invention emulates the interactive relationship between the student and the teacher wherein the student is observed by the teacher while performing. The teacher expresses a positive evaluation of the students act with something like, "85%", or "very good" which reinforces that which was correct. The teacher communicates the negative aspects of the attempt by making specific corrective recommendations. The teacher observes each new attempt, evaluates and responds appropriately as before, guiding the pupil ever closer to a successful performance. The teacher can elect to repeat the activity until the student succeeds.

The program possesses side benefits. It can be made to keep performance records such as grades and the number of attempts to achieve success for each student so that both the student and the program can be continuously evaluated.

BRIEF DESCRIPTION OF THE DRAWINGS

The single FIGURE, divided into FIGS. 1A, 1B and 1C to enable the use of a scale that is large enough to be easily legible, is a flowchart outlining the steps performed in the preferred embodiment of the invention.

DESCRIPTION OF A PREFERRED EMBODIMENT

A computer is provided with input and output communicating hardware means which allows the computer to perceive the aspects of the student's inputted act and to report back to the student on its evaluation which varies somewhat with the art that is being practiced.

The computer response can be output means be graphically displayed on the CRT screen; or verbally or numerically displayed on the CRT; or with audible sound or tone codes; or verbalized via loudspeaker; or variations and combinations of the above.

Input device means for the program include keyboard; graphics tablet; light pen and prepared CRT; mouse; microphone; video camera; or variations and combinations of the above.

Computer program means are provided, as a class, which provide computer assisted drills for perfecting skill performance said program means being in operating cooperation with said computer means and said input-output communicating means. The program means comprising idealized attribute means not shown in the display and therefore hidden until specifically denied, comparison means and evaluation feedback means in the following interactive sequence.

The student performs a prescribed exercise in the discipline being taught, which is received by the computer's program means through the input means. The program means digitally records the relevant details of the student's performance. It compares them with the details of an ideal performance previously created, digitized and stored. The program means then provides the student, through the output means, with a brief critique or grade accurately reflecting how precisely his/her performance approached the ideal. If the program finds the performance unacceptable, it presents detailed instructions as to how to correct recognized errors. The student is asked to attempt an improved performance by observing the corrective instructions.

The new performance is again compared to the ideal performance and a fresh critique or grade is awarded the student. New corrective instructions are presented and the student is asked to try an improved performance. This interactive process of student trial and computer corrective feedback is repeatable as often as is necessary for the student to be able to perform the art or skill correctly and reliably.

EXAMPLE

A sample program has been prepared to demonstrate the principle of the computer assisted coaching of the present invention. It demonstrates feedback guidance that is the heart of the program and operates with the use of a graphics tablet as the input hardware for the student. The CRT verbal and numerical displays provide the output for the computer program.

The exercise is intended to develop and improve the student's spatial judgment abilities by directing him to translate verbal and numerical directives into graphic expression. He is asked to find the location, direction and length of an unknown vector, which is an idealized hidden attribute. He is asked to draw a vector of his own creation on the graphics tablet which is digitized, displayed on the CRT and compared by the program with the hidden vector. Two evaluation responses are printed out for the student. The first describes the degree of success of the attempt verbally with adjectives:

1% error: "Your attempt was perfect"
2% error: "Your attempt was excellent"
5% error: "Your attempt was very good"
14% error: "Your attempt was good"
37% error: "Your attempt was fair"
70% error: "Your attempt was poor"

The second response instructs the student where to draw the next vector so that it will be correct. This is done in three steps. The student is told:

1. How many screen units up/down and right/left the center of the vector should be moved to be correct.
2. How many screen units longer or shorter the vector is to be.
3. How many degrees to the right or left the vector should be rotated to be correct.

The following is a sample of screen feedback:

---

YOUR ATTEMPT WAS VERY GOOD
SHIFT THE CENTER OF THE LINE 7.25 UNITS TO THE RIGHT
AND 2.57 UNITS DOWN
DRAW THE LINE AT 4.78 DEGREES ANGLE FROM THE OLD LINE

```
MAKE THE LINE SHORTER BY 21.47 PERCENT
TYPE 0 TO SEE THE GRAPHICAL COMPARISON
    1 TO DRAW THE LINE AGAIN
```

Feedback given by the coaching computer program to the student's attempt at drawing the line.

The student draws a new vector as instructed and a new evaluation is reported on the attempt. The attempt is repeated until the student's attempt is within 1% of the correct vector.

The same program permits the teacher or operator to place a new vector into program memory to be located again by the same technique. This demonstrates the ability of the program to be adapted to an infinite number of exercises within a given discipline.

The number of different vector parameters possible to enter into the program and the number of individualized evaluations possible for the program to generate are virtually limitless. This demonstrates the infinite flexibility of the program within a given exercise.

The following is a description of the steps of performing the computer assisted coaching system of the invention together with indicated programs. This description provides documentation of the prepared sample program described under "EXAMPLE" above.

There are five major parts or groups of steps as follows, each comprising a number of individual steps or substeps:

1. Define the active area on the graphics tablet, i.e. create GRID.DAT.
   a) Enter TEKTAB, a proprietary software by TEKTRONIX.
   b) Put the tablet in the single-point mode.
   c) Touch the pen to the lower left corner.
   d) Touch the pen to the upper right corner.
2. Define the line internally.
   a) Execute CRTE.FOR to create MAIN.DAT.
3. Ask the student to draw a line on the tablet, i.e., create DRAW.DAT.
   a) Enter TEKTAB.
   b) Put the tablet in the multi-point mode.
   c) Draw the line with the pen.
4. Evaluate the line drawn by the student.
   a) Execute EVAL.FOR.
5. If the results of the evaluation are satisfactory, stop. Otherwise repeat steps 3 and 4 until the student has learned to draw the line satisfactorily.

Listing of file CRTE.FOR

```
C     PROGRAM TO DEFINE THE GRID FOR DRAWING A LINE.
C     THE GRID IS DEFINED BY BOTTOM-LEFT AND TOP-RIGHT POINTS.
C
      REAL*8 RANX, RANY, RANYFL
      CHARACTER*4 ATMP
 5    WRITE(*,'(A)') ' ENTER THE RANDOM SEED NUMBER AS N.0'
      READ(*,*) RANX
      IF (RANX.LE.0.0) GOTO 5
C
      OPEN (UNIT=10,FILE='GRID.DAT')
 10   READ(10,9001) ATMP
 9001 FORMAT (A4)
      IF (ATMP.EQ.' TEK') GOTO 10
      BACKSPACE (10)
C
 20   READ(10,9002) X0, Y0, ATMP
 9002 FORMAT (F10.6,3X,F10.6,A1)
      IF (ATMP.EQ.'M') GOTO 29
      GOTO 20
 29   READ(10,9002) X1, Y1, ATMP
      IF (ATMP.EQ.'M') GOTO 30
      GOTO 29
 30   CLOSE (UNIT=10)
C
 100  CALL RANDU (RANX,RANY,RANYFL)
      XA = X0 + (X1-X0) * (0.01+0.80*RANYFL)
      CALL RANDU (RANX,RANY,RANYFL)
      XB = XA + (X1-XA) * (0.01+0.98*RANYFL)
      CALL RANDU (RANX,RANY,RANYFL)
      YA = Y0 + (Y1-Y0) * (0.01+0.98*RANYFL)
      CALL RANDU (RANX,RANY,RANYFL)
      YB = Y0 + (Y1-Y0) * (0.01+0.98*RANYFL)
      IF (((XA-XB)**2+(YA-YB)**2) .LE. 100.0) GOTO 100
C
```

```fortran
      OPEN (UNIT=10,FILE='MAIN.DAT')
      WRITE(10,9101) X0,Y0, X1,Y1, XA,YA, XB,YB
 9101 FORMAT (2F15.10,/,2F15.10,/,2F15.10,/,2F15.10)
      CLOSE (UNIT=10)
C
      XAT = (XA-X0) / (X1-X0) * 100
      XBT = (XB-X0) / (X1-X0) * 100
      YAT = (YA-Y0) / (Y1-Y0) * 100
      YBT = (YB-Y0) / (Y1-Y0) * 100
      XCNTR = (XAT+XBT) / 2.0
      YCNTR = (YAT+YBT) / 2.0
      ALENGT = SQRT((XAT-XBT)**2+(YAT-YBT)**2)
      ANGLE = 3.14159 * ATAN2((YBT-YAT),(XBT-XAT))
      WRITE(*,9201) XCNTR, YCNTR, ANGLE, ALENGT
 9201 FORMAT (/,' THE CENTER OF THE LINE IS LOCATED AT',2F5.0,/,/,
     #  ' THE LINE IS AT',F5.0,' DEGREE ANGLE',
     #  ' AND IS',F5.0,' UNITS LONG.',/,/,
     #  ' PLEASE ENTER 0 TO DRAW THE LINE',/,/,/)
      READ(*,*) ITMP
      STOP END
C
C
      SUBROUTINE RANDU (RANX,RANY,RANYFL)
      REAL*8 RANX, RANY, RANYFL, I231
      I231 = 2.0**30
      I231 = 2.0 * I231
      RANY = DMOD((RANX*65539.0),I231)
      RANYFL = RANY / I231
      RANX = RANY
      RETURN
      END
```

Listing of file EVAL.FOR

```fortran
C     THIS PROGRAM COMPARES THE LINE DRAWN BY A STUDENT WITH THE
C        INTERNALLY CREATED LINE AND GUIDES THE STUDENT TO A BETTER
C        SOLUTION.
C
      CHARACTER*8 XSHIFT, YSHIFT, LSHIFT
      CHARACTER*4 ATMP
      DIMENSION X(2000), Y(2000), XTMP(2), YTMP(2)
C
      OPEN (UNIT=10,FILE='MAIN.DAT')
      READ(10,9001) X0,Y0, X1,Y1, XA,YA, XB,YB
 9001 FORMAT (2F15.10)
      CLOSE (UNIT=10)
C
      OPEN (UNIT=10,FILE='DRAW.DAT')
 70   READ(10,9013) ATMP
 9013 FORMAT (A4)
      IF (ATMP.EQ.' TEK') GOTO 70
      BACKSPACE (10)
C
      M = 0
 90   M = M + 1
```

```fortran
      IF (M.GT.2000) GOTO 100
      READ(10,9011,END=100) X(M), Y(M)
 9011 FORMAT (F10.6,3X,F10.6)
      GOTO 90
  100 M = M - 1
C
      XS = X(1)
      YS = Y(1)
      XE = X(M)
      YE = Y(M)
C
      XAT = (XA-X0) / (X1-X0)
      YAT = (YA-Y0) / (Y1-Y0)
      XBT = (XB-X0) / (X1-X0)
      YBT = (YB-Y0) / (Y1-Y0)
      XST = (XS-X0) / (X1-X0)
      YST = (YS-Y0) / (Y1-Y0)
      XET = (XE-X0) / (X1-X0)
      YET = (YE-Y0) / (Y1-Y0)
      ERRX   = (XST+XET)/2.0 - (XAT+XBT)/2.0
      ERRY   = (YST+YET)/2.0 - (YAT+YBT)/2.0
      ERRCEN = SQRT(ABS(ERRX)**2+ABS(ERRY)**2)
      XLENG1 = SQRT((XBT-XAT)**2+(YBT-YAT)**2)
      XLENG2 = SQRT((XET-XST)**2+(YET-YST)**2)
      ERRLEN = ABS(XLENG2-XLENG1)
      ANGLE1 = ATAN2((YBT-YAT),(XBT-XAT)) * 180.0 / 3.14159
      ANGLE2 = ATAN2((YET-YST),(XET-XST)) * 180.0 / 3.14159
      ERRANG = ABS(ANGLE2-ANGLE1) / 180.0
      IF (ERRANG.GT.1.0) ERRANG = 2.0 - ERRANG
      ERROR = (ERRCEN+ABS(ERRLEN)+ERRANG) / 3.0
C
C     ERROR WILL BE BETWEEN 0.0 AND 1.0, AND WE ARE USING 6 GRADES.
C     (100%ERROR) ** (1/6) = 2.154434969%
      IF (ERROR.GT.0.0215443469) GOTO 312
      WRITE(*,'(A)') ' YOUR ATTEMPT WAS PERFECT'
      GOTO 350
  312 IF (ERROR.GT.0.04641588834) GOTO 314
      WRITE(*,'(A)') ' YOUR ATTEMPT WAS EXCELLENT'
      GOTO 350
  314 IF (ERROR.GT.0.1) GOTO 316
      WRITE(*,'(A)') ' YOUR ATTEMPT WAS VERY GOOD'
      GOTO 350
  316 IF (ERROR.GT.0.215443469) GOTO 318
      WRITE(*,'(A)') ' YOUR ATTEMPT WAS GOOD'
      GOTO 350
  318 IF (ERROR.GT.0.4641588834) GOTO 320
      WRITE(*,'(A)') ' YOUR ATTEMPT WAS FAIR'
      GOTO 350
  320 WRITE(*,'(A)') ' YOUR ATTEMPT WAS POOR'
      GOTO 350
C
  350 CONTINUE
      XSHIFT = 'RIGHT'
      IF (ERRX.GT.0.0) XSHIFT = 'LEFT'
      AERRX = ABS(100.0*ERRX)
      YSHIFT = 'UP'
      IF (ERRY.GT.0.0) YSHIFT = 'DOWN'
      AERRY = ABS(100.0*ERRY)
      ERRA = ANGLE2 - ANGLE1
      LSHIFT = 'LONGER'
      IF (XLENG2.GT.XLENG1) LSHIFT = 'SHORTER'
      AERRL = ABS(100.0*(XLENG1/XLENG2-1.0))
      WRITE(*,9310) AERRX,XSHIFT, AERRY,YSHIFT, ERRA, LSHIFT,AERRL
```

```
 9310 FORMAT (/,' SHIFT THE CENTER OF THE LINE',F10.2,' UNITS TO',
     #   ' THE ',A8,/,25X,' AND',F10.2,' UNITS ',A8,/,/,
     #   ' DRAW THE LINE AT',F10.2,' DEGREES ANGLE FROM THE OLD LINE',
     #   /,/,' MAKE THE LINE ',A8,' BY',F10.2,' PERCENT',/,/)
       WRITE(*,'(A,/,A)') ' TYPE 0 TO SEE THE GRAPHICAL COMPARISON',
     # '          1 TO DRAW THE LINE AGAIN'
       READ(*,*) ITMP
       IF (ITMP.NE.0) STOP
C
C      THIS IS THE TEKTRONICS ROUTINE PART TO REVIEW PICTURES
C
       CALL TK4010 (240,0)
       CALL PAGE (11,11)
       CALL AREA2D (8.0,8.0)
       XLOW  = AMIN1(X0,XS,XE)
       XHIGH = AMAX1(X1,XS,XE)
       YLOW  = AMIN1(Y0,YS,YE)
       YHIGH = AMAX1(Y1,YS,YE)
       XSTP  = (XHIGH-XLOW) / 100
       YSTP  = (YHIGH-YLOW) / 100
       CALL GRAF (XLOW,XSTEP,XHIGH,YLOW,YSTP,YHIGH)
       CALL FRAME
       XTMP(1) = XA
       YTMP(1) = YA

XTMP(2) = XB
       YTMP(2) = YB
       CALL CURVE (XTMP,YTMP,2,0)
       CALL CURVE (X,Y,M,0)
       CALL ENDPL (0)
       CALL DONEPL
C
C
       STOP
       END
```

Listing of file DRAW.DAT

TEKFILE
| | |
|---|---|
| 108.333328 | 54.687500M |
| 108.333328 | 54.687500J |
| 108.333328 | 54.687500J |
| 112.500000 | 115.104156J |
| 112.500000 | 115.104156J |

Listing of file GRID.DAT

TEKFILE
| | |
|---|---|
| 94.270828 | 32.291664M |
| 94.270828 | 32.291664J |
| 94.270828 | 32.291664J |
| 94.270828 | 32.291664J |
| 94.270828 | 32.291664J |

```
 94.270828    32.291664J
201.041656   135.416656M
201.041656   135.416656J
201.041656   135.416656J
201.041656   135.416656J
201.041656   135.416656J
201.041656   135.416656J
201.041656   135.416656J
201.041656   135.937500J
201.041656   135.937500J
201.041656   135.937500J
201.041656   135.937500J
```

Listing of file MAIN.DAT

```
 94.2708282471   32.2916641235
201.0416564941  135.4166564941
105.6074371338   59.8028259277
108.9049835205  111.3985595703
```

While the computer program set out above is easily read and understood by those skilled in the art, the following "translation" is provided for the benefit of interested readers who are not skilled in this art:

There are five major parts or groups of steps to this program, each comprising a number of individual steps or substeps. In the flowchart shown in the FIGURE (arranged on three pages as FIGS. 1A, 1B and 1C), the first part of the program comprises steps 1-3; the second part steps 4 and 5; the third part steps 6-9; the fourth steps 10 and 11; and the fifth part steps 12-20.

Figure 1A:
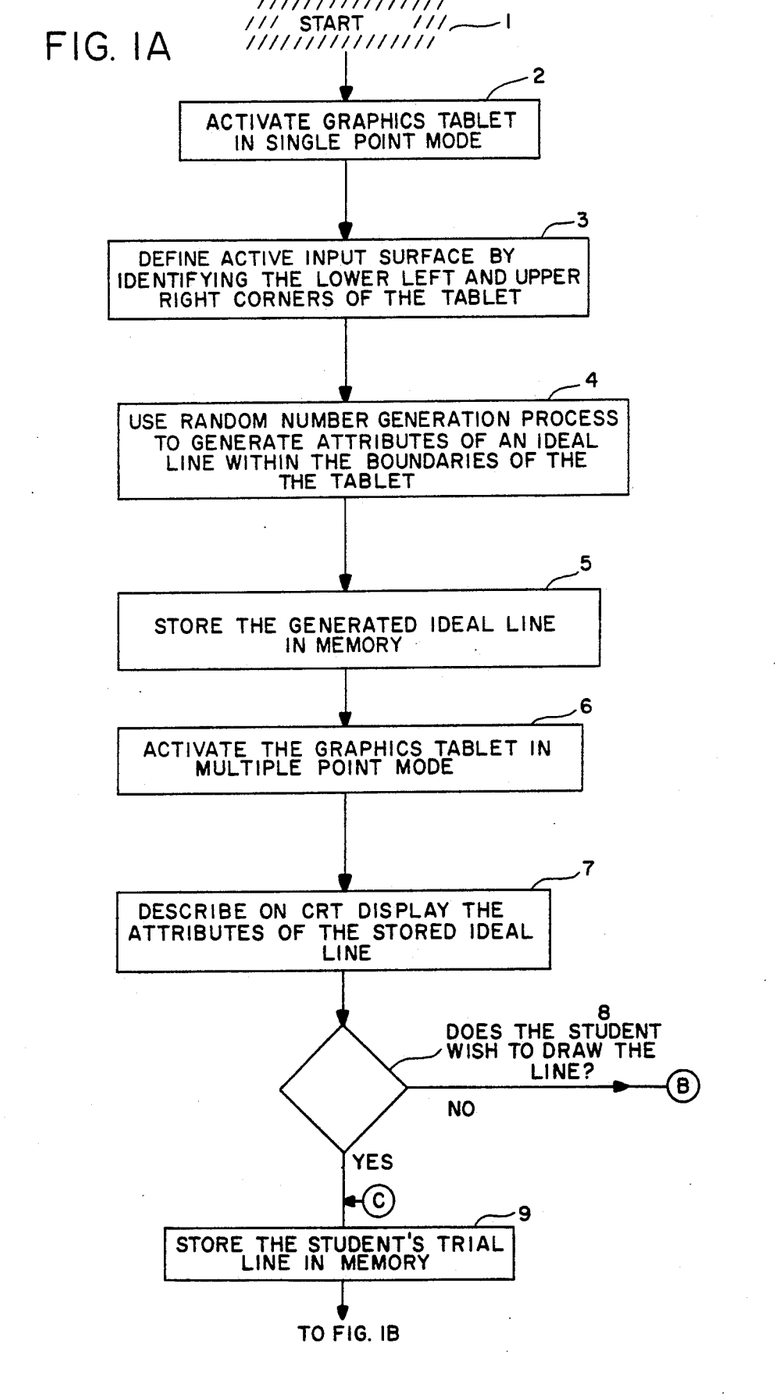

In the first part of the program (steps 1-3 of the flowchart), the student or other user of the system must define an active area or grid of the input hardware (e.g., a graphics tablet) by creating GRID.DAT. To this end, at step 1, the student enters TEKTAB, a proprietary software package by Tektronix. At step 2, the program activates the graphics tablet in a single point mode in order to receive a single point input. At step 3, the program requires the student or other user to touch a stylus or pen to the lower left and upper right corners of the graphics tablet. These three steps are necessary so that the computer can recognize all input drawn within the designated boundaries of the graphics tablet.

In the second part of the program (steps 4 and 5 of the flowchart), the computer defines a figure internally. Specifically, at step 4 of the flowchart, the program executes CRETE.FOR, a random number generation process to create (MAIN.DAT), a set of numbers representative of the figure within the defined boundaries of the graphics tablet. The numbers of this set are representative of the attributes of the figure: e.g., the length, angular orientation, and center point of a line. At step 5 of the flowchart, the computer stores the set of numbers in appropriate addresses of the computer memory.

In the third part of the program, represented by steps 6-9 of the flowchart, the student is requested to draw a trial line in imitation or in quest of the ideal line generated internally at step 4 by creating DRAW.DAT. and entering TEKTAB. Accordingly, at step 6 of the flowchart, the program activates the graphics tablet in multiple point mode for the student's input. At step 7, the program describes on the CRT screen the attributes of the hidden ideal line, for example, "The center of the line is located 3 units (e.g., pixels) to the right and 4 units down from the center of the screen, and the line is at an angle measuring 30 degrees counterclockwise from the horizontal and is 40 units long."

Equipped with a verbal and numerical description of the line, the student is then invited to draw the line on the graphics tablet at step 8 of the flowchart. If the student declines by typing NO, the program terminates. If the student accepts by typing YES, he or she exercises his or her spatial abilities by translating the verbal and numerical description provided by the computer into graphical expression. An analog-to-digital converter digitizes the line drawn by the student and assigns a group of corresponding pixels on a CRT screen. At step 9 of the flowchart, the computer stores these locations in corresponding addresses in memory.

Figure 1B:
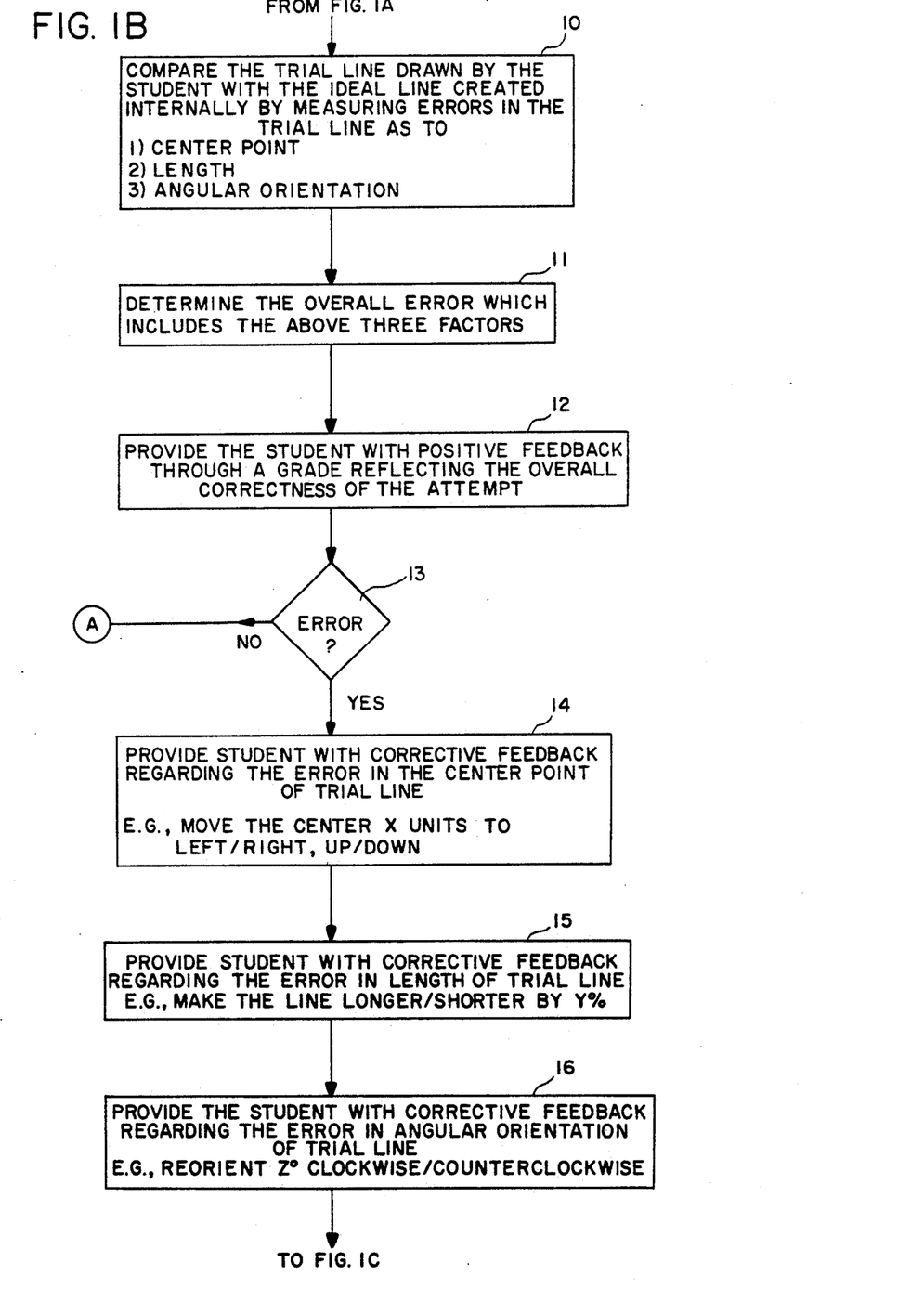

In the fourth part of the program, represented by steps 10 and 11 of the flowchart, the computer evaluates the line drawn by the student by executing EVAL.-FOR. To this end, at step 10 of the flowchart, the program directs the computer to compare the trial line drawn by the student to the ideal line created internally by measuring differences or errors in the center point, length, and angular orientation of the respective lines. The computer then compares the values stored in memory B defining the ideal line with the respectively corresponding values stored in memory defining the trial line, and computes their differences. At step 11 of the flowchart, the program then computes an overall error based on the parameters computed at step 10.

In part five of the program, represented by steps 12-20 of the flowchart, the computer provides the results of the evaluation. Specifically, at step 12 of the flowchart, the program provides the student with positive feedback through a grade reflecting the overall correctness of his or her attempt. The program displays an output such as "2% error: your attempt was excellent." At decision step 13 of the flowchart, the program determines if the student has drawn the line perfectly, i.e., the error is within 1%. If so, the program loops forward to step 20 and terminates. If the error is greater than 1%, then the program moves to steps 14, 15, and 16 sequentially, thereby providing the student with corrective feedback regarding the error in the center point, length, and angular orientation of the line.

For example, the program will designate how many screen units up/down or right/left the center of the trial line should be moved (step 14), by what percent the trial line should be lengthened or shortened (step 15), and by how many degrees the trial line should be reoriented clockwise or counterclockwise (step 16).

Figure 1C:
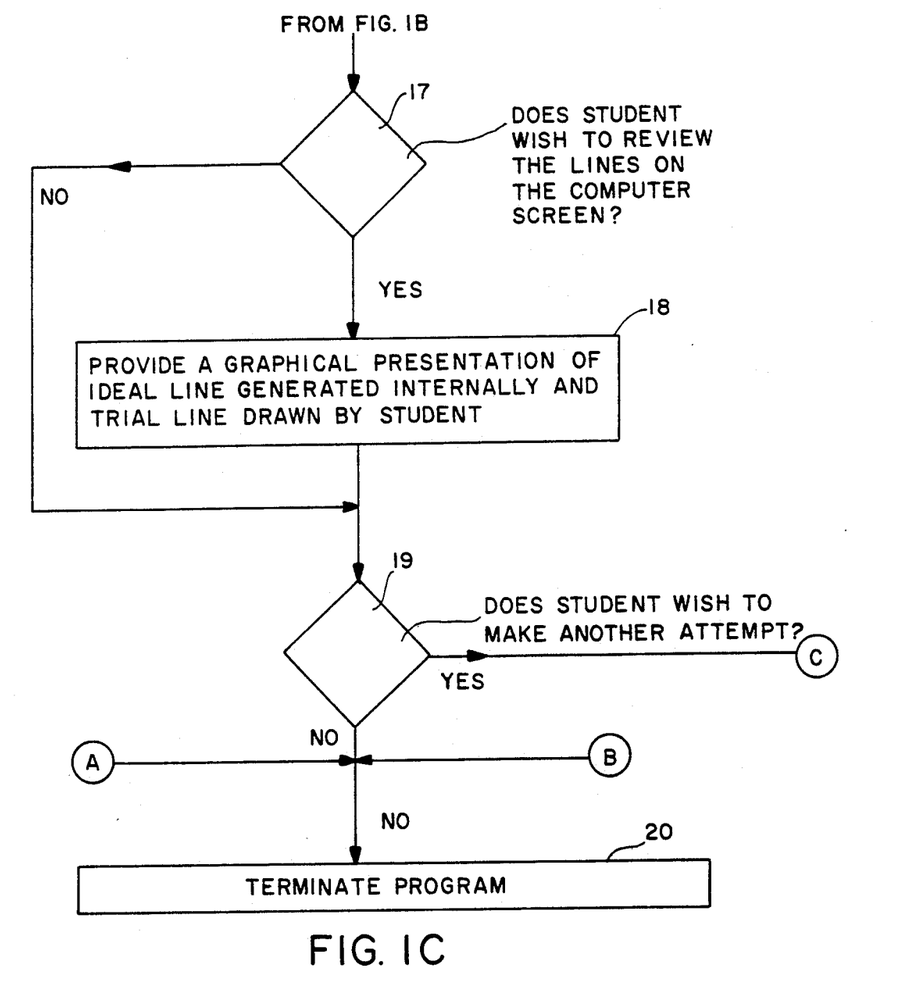

At decision step 17 of the flowchart, the program asks the student if he/she wishes to review the lines on the computer screen. If the student types YES, the program moves to step 18, which provides the student with a graphical presentation on the CRT screen of the ideal line generated by the system and the trial line drawn by the student. If the student types NO, the program loops forward to decision step 19, which asks the student if he/she wishes to make another attempt. If the student types YES at step 19, the program loops back to step 9. If the student types NO, the program progresses to step 20 and terminates.

Through this type of exercise, the student can develop and improve his/her spatial judgment by converting conceptual knowledge into graphic reality.

The present invention can be applied to all arts and skills that can be taught. Some examples include:

Graphic arts—including lettering, drawing, painting, drafting—where such physical properties such as size, shape, length, width, height, location, color, direction can be compared and evaluated by the computer.

Music—instrumental and voice. Note frequency and duration, dynamics, timbre are characteristics of the sound of music that can be readily digitized by the computer and subjected to comparison and analysis.

Physical skills—such as dental surgery, general surgery, sculpting, architecture produce acts that can be described in terms as shape, height, width, depth, location and color and are subject to this program utilization.

Examples of specific programs are listed as follows:

OPERATIVE DENTISTRY

To teach the dental student how to design cavity preparations. An enlarged image of the tooth to be treated is displayed on the CRT. The student is directed to draw on the displayed image the ideal cavity design appropriate for the correction of the described lesion with a prescribed restorative material. The student's drawing is analyzed, graded for merit and corrective directions to produce a more perfect solution are displayed verbally on the CRT, if appropriate. The student is directed to repeat the exercise until he has arrived at the perfect solution. Using the last design attempt and the specific corrective directions generated by the program, the student is able to produce an ever more perfect solution until he finally succeeds in producing a correct design.

Each design is infinitely repeatable and can be used, not only to learn to produce the correct solution, but with repetition, to become more proficient in doing so.

HAND LETTERING

To teach writing upper and lower case block letters of the Roman alphabet to children, the illiterate, and the foreign born. The pupil is instructed what letter to draw and how to draw it by words spoken by computer recording and simultaneously produced, stroke by stroke, on the CRT. The CRT screen clears and the pupil is directed to draw the same letter on the screen. The program compares the pupil's attempt with the hidden ideal letter and reports by spoken word an evaluation of the effort and specific instructions how to correct any error noted. The pupil is directed to repeat each letter exercise until judged correct by the program. Each exercise is infinitely repeatable and each letter exercise is individually selectable if desired, otherwise the exercises rotate in alphabetical order.

While the foregoing is illustrative of a preferred embodiment, other embodiments may be had within the teachings hereof.

We claim:

1. A computerized coaching method for teaching a student to acquire and develop an artistic skill by using a computer, said teaching method comprising the steps of:

generating a set of random numbers defining the attributes of an ideal figure and storing the random numbers;

communicating the attributes of the ideal figure to a student;

inviting the student to draw a trial figure conforming to the communicated attributes in quest of the ideal figure;

generating the attributes of the trial figure based on the response of the student;

making a comparison of the attributes of the ideal figure with the attributes of the trial figure; and verbally and numerically communicating instructions to the student for correcting the trial figure so that it conforms to the ideal figure.

2. A teaching method according to claim 1 wherein the attributes of the ideal figure are generated in a digital form and the trial figure is generated in graphic form and further comprising the steps of converting the digital form to a verbal and numerical form for communication to the student and coverting the graphic form to a digital form, whereby the comparison is effected digitally.

3. A method according to claim 1 wherein the ideal figure is an ideal line and the random numbers comprise a first set of numbers corresponding to a center point of the ideal line, a second number corresponding to a length of the ideal line, and a third number corresponding to an angular orientation of the ideal line.

4. A method according to claim 3, wherein the step of verbally and numerically communicating instructions to the student comprises the step of employing a CRT display for visual communication to the student.

5. A method according to claim 4 comprising the step of making an audible communication to the student.

6. A method according to claim 3, wherein the step of generating the attributes of trial figure comprising the step of generating a first set of numbers corresponding to a center point of the trial line, a second number corresponding to a length of the trial line, and a third number corresponding to an angular orientation of the trial line.

7. A method according to claim 6, wherein the step of making a comparison comprises the step of comparing the trial line with the ideal line by calculating the difference between the respective center points of the trial line and the ideal line.

8. A method according to claim 7 comprising the step of comparing the trial line with the ideal line by calculating the difference between their respective lengths.

9. A method according to claim 8 comprising the step of comparing the trial line with the ideal line by calculating the difference between their respective angular orientations.

10. A method according to claim 9, wherein the step of making a comparison further comprises the step of determining an overall error based on the comparison of the respective center points, lengths and angular orientations of the trial and ideal lines and communicating the overall error to the student.

11. A method according to claim 1, wherein the step of generating the trail figure comprises the step of employing a graphics tablet for use by the student in drawing the trial figure.

12. A computerized coaching method for teaching a student to acquire and develop an artistic skill by using a computer, said method of teaching a student comprising the steps of:

generating a predetermined center location, a predetermined length and a predetermined orientation, as three attributes of an ideal line that is hidden from the student, wherein the step of generating the three attributes of the ideal line comprises the steps of inviting an instructor to draw the ideal line and determining the center location, length and orientation of the ideal line drawn by the instructor;

communicating said three attributes to the student in verbal and numerical terms;

inviting the student to attempt to draw a trial line that has said three attributes;

determining the center location, length and orientation of the trial line drawn by the student;

comparing the center location of the trial line with the center location of the ideal line;

comparing the length of the trial line with the length of the ideal line;

comparing the orientation of the trial line with the orientation of the ideal line; and     instructing the student in verbal and numerical terms to relocate the center of a succeeding trial line to make its location correct, to draw the succeeding trial line to make its length correct and to reorient the succeeding trial line to make its orientation correct.

* * * * *